April 28, 1959     K. LEHOVEC     2,884,576

TWO-WAY RECTIFIER

Filed June 26, 1953

INVENTOR.
KURT LEHOVEC
BY Connolly + Hutz
HIS ATTORNEYS

United States Patent Office 2,884,576
Patented Apr. 28, 1959

2,884,576

TWO-WAY RECTIFIER

Kurt Lehovec, Williamstown, Mass., assignor to Sprague Electric Company, North Adams, Mass., a corporation of Massachusetts Application June 26, 1953, Serial No. 364,456

2 Claims. (Cl. 317—234)

The present invention relates to a new type of two-way rectifying construction for use in rectifying an A.C. output.

Figure 1:
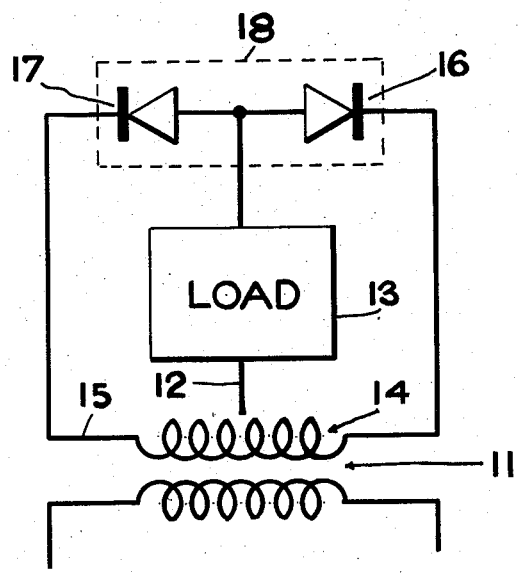
Figure 2:
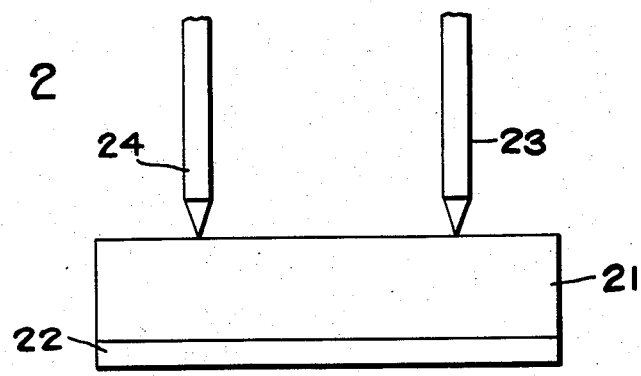
Figure 3:
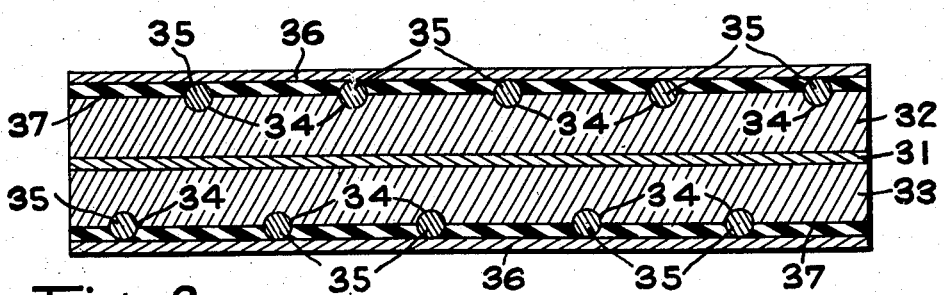

It is an object of this invention to create a new two-way rectifying device which can be easily and conveniently used in many electronic circuits. A further object is to produce a new type of two-way rectifier which can be produced inexpensively by utilizing techniques and apparatus presently available for other purposes. These and further objects of the invention, as well as the advantages of it, will be apparent from this description, the appended claims, as well as the accompanying drawing in which:

Fig. 1 diagrammatically shows a customary circuit for rectifying an A.C. output;

Fig. 2 illustrates diagrammatically a new type of two-way rectifier in accordance with this invention; and Fig. 3 shows a diagrammatic sectional view of a modified two-way rectifier of the invention.

The prior art rectifiers are of numerous types and are discussed at length in many texts and literature articles. For many purposes, most of them is somewhat satisfactory. None of them is completely acceptable from the considerations of cost of production, size, and effectiveness in a variety of conditions. It has been discovered that a very suitable two-way rectifier for use in an A.C. circuit, such as is shown in Fig. 1 of the drawing, can be created by using a "bad" transistor in which there is no interaction between the collector and the emitter electrodes. Obviously, the term "bad" as used in this specification is not, strictly speaking, an accurate one, inasmuch as the specific two-way rectifiers of the invention are not normally rejects in transistor manufacturing procedures.

In Fig. 1 of the drawing, there is shown a customary circuit for rectifying an A.C. output consisting of a transformer 11 connected by means of a center tap 12 to one side of a load 13 which is in turn connected to each of the ends 14 and 15 of the secondary winding of the transformer by means of rectifiers 16 and and 17. The portion of the circuit within the dotted area 18 consisting essentially of the two rectifiers and three leads, one going to the load 13, and the other two going to the ends 14 and 15 of the secondary winding can be readily replaced in accordance with the instant disclosure by a single "transistor" type rectifying apparatus.

Such an apparatus is shown diagrammatically in Fig. 2 of the drawing as consisting primarily of a body of a semiconductive material 21 to which there is attached, in accordance with known procedures in the art, a low ohmic electrode 22. Two wire probe point contacts 23 and 24 are positioned so as to form rectifying junctions with the body of the semiconductive material 21. There should be substantially no interaction between the two contacts 23 and 24 if the device is to function satisfactorily as a two-way rectifier. In general, a distance between the points of at least 1 millimeter is satisfactory, although this distance will vary slightly depending upon the type of semiconductor employed with the invention, as well as the surface treatment of the semiconductive body.

In use, a device as is shown in Fig. 2 is connected so that low ohmic electrode 22 is attached to load 13 of the circuit shown in Fig. 1 and two-way contacts 23 and 24 are attached to ends 14 and 15 of the secondary winding of transformer 11. The precise means of attaching leads to the various elements, as well as suitable protective constructions for use around the entire device shown in Fig. 2 are well-known to the art, and, in fact, can be taken directly from the transistor field.

A modified two-way rectifying apparatus of the invention is shown in Fig. 3 of the drawing as consisting primarily of a central non-rectifying electrode 31 of a suitable metallic conductor, for example, copper. Two separate layers 32 and 33 of germanium are attached to electrode 31, as by soldering. Rectifying connections are made by placing a plurality of small cavities 34 within the exposed surface of the semiconductor layers 32 and 33, and then filling the cavities 34 with droplets of mercury 35 which are sealed in place by metallic layers 36 that make electrical contact with the mercury droplets 35 but are insulated from the layers 32 and 33 by an insulating gasket 37 of nonconductive glues or resins, or the like. The precise type of mercury point contact used in this modification of the invention is more fully described in my copending patent application, Serial No. 364,457 entitled "Rectifying Contact," filed concurrently herewith.

Those skilled in the art will realize that the two-way rectifiers of the invention can be formed with a variety of different semiconductor materials. The preferred materials are at present p or n type germanium or silicon single crystal wafers. However, other semiconductors such as, for example, silicon carbide, can be used satisfactorily with the invention. A number of modifications can, of course, be made within the broad scope of this disclosure. Thus, for example, a two-way rectifier using point contacts can be created in which a low ohmic electrode connection is made on one side of a cube of semiconductor material and the rectifying contacts are made upon opposed surfaces of this cube. Mercury point contacts as indicated can be substituted for other rectifying connections, such as wire probes, and vice versa. Many other such modifications will occur to those skilled in the art. Such adaptations of the inventive concept are to be considered as part of it, insofar as they are defined by the appended claims.

What is claimed is:

1. A two-way rectifier which comprises two layers of semiconductor materials joined together by a common non-rectifying low resistance electrode, and at least one rectifying electrode consisting of a mercury droplet positioned against each of said semiconductive bodies.

2. A two-way rectifier comprising a pair of semi-conductive bodies mounted on opopsite faces of a common low ohmic electrode plate, a plurality of recesses formed in the exposed faces of each of said respective semiconductive bodies, mercury droplets seated in said recesses, and conductor means electrically insulated from said semi-conductive bodies but separately contacting the mercury droplets of the respective bodies to provide rectifying point contacts with each semi-conductive body.

References Cited in the file of this patent

UNITED STATES PATENTS

| | | |
|---|---|---|
| 2,367,943 | Hein | Jan. 23, 1945 |
| 2,402,661 | Ohl | June 25, 1946 |
| 2,438,893 | Bieling | Apr. 6, 1948 |
| 2,560,579 | Kock et al. | July 17, 1951 |
| 2,618,691 | Bethge et al. | Nov. 18, 1952 |
| 2,641,639 | Slade | June 9, 1953 |
| 2,666,873 | Slade | Jan. 19, 1954 |